US012630229B2

(12) United States Patent
Wu et al.

(10) Patent No.: US 12,630,229 B2
(45) Date of Patent: May 19, 2026

(54) LOCKING MECHANISM OF TRAILER CARRIAGE, AND TRAILER CARRIAGE

(71) Applicant: GUANGDONG FUWA HEAVY INDUSTRIES CO., LTD., Jiangmen (CN)

(72) Inventors: Zhiqiang Wu, Jiangmen (CN); Yu Wang, Jiangmen (CN); Heng Zhang, Jiangmen (CN)

(73) Assignee: GUANGDONG FUWA HEAVY INDUSTRIES CO., LTD., Jiangmen (CN)

( * ) Notice: Subject to any disclaimer, the term of this patent is extended or adjusted under 35 U.S.C. 154(b) by 327 days.

(21) Appl. No.: 18/283,507

(22) PCT Filed: Aug. 4, 2022

(86) PCT No.: PCT/CN2022/110378
§ 371 (c)(1),
(2) Date: Sep. 22, 2023

(87) PCT Pub. No.: WO2023/236339
PCT Pub. Date: Dec. 14, 2023

(65) Prior Publication Data
US 2025/0033703 A1 Jan. 30, 2025

(30) Foreign Application Priority Data
Jun. 5, 2022 (CN) .......................... 202210626744.9

(51) Int. Cl.
*B62D 21/20* (2006.01)
*B62D 21/11* (2006.01)
*B62D 21/14* (2006.01)

(52) U.S. Cl.
CPC .............. *B62D 21/20* (2013.01); *B62D 21/11* (2013.01); *B62D 21/14* (2013.01)

(58) Field of Classification Search
CPC ........ B62D 21/20; B62D 21/11; B62D 21/14; B62D 53/00; B60L 9/00; B60L 9/04;
(Continued)

(56) References Cited

U.S. PATENT DOCUMENTS 2,818,272 A * 12/1957 Manford ................ B62D 21/14
280/789
3,372,946 A * 3/1968 Hutchens .................. B60P 1/52
280/149.2
(Continued)

FOREIGN PATENT DOCUMENTS

CN 202029963 U 11/2011
CN 204432478 U 7/2015
(Continued)

OTHER PUBLICATIONS

KR-20170132929-A English Translation (Year: 2017).*
CN-210063180-U English Translation (Year: 2020).*

*Primary Examiner* — Michael T. Walsh
(74) *Attorney, Agent, or Firm* — The Webb Law Firm

(57) ABSTRACT
A locking mechanism of a trailer carriage includes a transmission shaft, two bolts, an airbag, and a swing arm. The transmission shaft is pivoted to the carriage and extends in a length direction of the carriage; the two bolts are movably connected to two sides of the carriage in a penetrating manner, each bolt is movable in a width direction of the carriage between a first position where the bolt is accommodated in the carriage and a second position where the bolt protrudes from a side edge of the carriage; and one end of the swing arm is connected to the transmission shaft and a connecting seat is formed at the other end of the swing arm, and one end of the airbag is connected to the carriage and the other end of the airbag is connected to the connecting seat.

14 Claims, 2 Drawing Sheets

(58) Field of Classification Search
CPC ......... B60L 2200/40; E02F 9/24; E02F 9/261;
E02F 9/0858; E02F 3/30; E02F 9/207;
E02D 7/22; E02D 17/13
See application file for complete search history.

(56)                    References Cited

U.S. PATENT DOCUMENTS

| | | | | |
|---|---|---|---|---|
| 3,374,010 | A * | 3/1968 | Crockett ............ | B62D 53/0807 |
| | | | | 280/682 |
| 4,286,797 | A * | 9/1981 | Mekosh, Jr. ............. | B60G 5/00 |
| | | | | 280/149.2 |
| 4,641,846 | A * | 2/1987 | Ehrhart ................ | B62D 53/068 |
| | | | | 280/149.2 |
| 4,838,578 | A * | 6/1989 | Baxter ................. | B62D 53/068 |
| | | | | 280/149.2 |
| 4,993,737 | A * | 2/1991 | Torcomian ......... | B62D 53/0814 |
| | | | | 280/407.1 |
| 5,232,234 | A * | 8/1993 | McCombs ............. | B60G 11/12 |
| | | | | 280/80.1 |
| 5,564,725 | A * | 10/1996 | Brazeal ................ | B62D 53/068 |
| | | | | 180/209 |
| 7,097,192 | B2 * | 8/2006 | Saieg ........................ | B60T 7/20 |
| | | | | 180/209 |
| 7,163,220 | B2 * | 1/2007 | Pappas ..................... | F16F 1/12 |
| | | | | 280/405.1 |
| 2007/0222169 | A1 | 9/2007 | Smith et al. | |
| 2019/0145503 | A1 * | 5/2019 | Wall ........................ | F16H 21/44 |
| | | | | 74/99 R |

FOREIGN PATENT DOCUMENTS

| | | | | | |
|---|---|---|---|---|---|
| CN | 109318760 | A | | 2/2019 | |
| CN | 210063180 | U | * | 2/2020 | |
| CN | 217575360 | U | | 10/2022 | |
| EP | 0298073 | A1 | | 1/1989 | |
| KR | 20170132929 | A | * | 12/2017 | ............... B60P 3/00 |

* cited by examiner

LOCKING MECHANISM OF TRAILER CARRIAGE, AND TRAILER CARRIAGE

CROSS-REFERENCE TO RELATED APPLICATIONS

This application is the United States national phase of International Application No. PCT/CN2022/110378 filed Aug. 4, 2022, and claims priority to Chinese Patent Application No. 202210626744.9 filed Jun. 5, 2022, the disclosures of which are hereby incorporated by reference in their entireties.

BACKGROUND

1. Technical Field

The present disclosure relates to the technical field of commercial vehicles, and in particular to a locking mechanism of a trailer carriage, and a trailer carriage.

2. Technical Considerations

A carriage is usually mounted on a girder of a trailer to adjust the distance between the trailer and a tractor, such that the load can be distributed reasonably and the trailer can be adapted to different roads. As an important part of the whole carriage assembly, a locking mechanism of a carriage is used to lock the carriage to a frame of the trailer to limit the relative position between the carriage and the frame, and release the restriction on the degree of freedom of the carriage when adjustment is needed, so that the carriage can move relative to the frame. The existing locking mechanism of a carriage usually adopts a pull rod to drive a rotating shaft to rotate, and bolts located at both sides of the carriage are driven by the rotating shaft to move towards the outside of the carriage or the inside of the carriage at the same time, to realize the insertion or detachment of the bolts from the carriage. However, the existing locking mechanism requires manual operation of the pull rod, and a large force needs to be applied to the pull rod to drive the rotating shaft to rotate, which consumes a lot of physical strength and causes great inconvenience in use.

SUMMARY

In view of the defects in the existing technology, a first object of the present disclosure is to provide a locking mechanism of a trailer carriage which is simple to operate and convenient to use.

A second object of the present disclosure is to provide a trailer carriage.

In order to achieve the first object, the present disclosure adopts the following technical scheme.

Provided is a locking mechanism of a trailer carriage, which is mounted on the carriage, and includes a transmission shaft, two bolts, an airbag and a swing arm;

the transmission shaft is pivoted to the carriage and extends in a length direction of the carriage;

the two bolts are movably connected to two sides of the carriage in a penetrating manner, each of the two bolts is movable in a width direction of the carriage between a first position where the bolt is accommodated in the carriage and a second position where the bolt protrudes from a side edge of the carriage, a connecting member is arranged between each bolt and the transmission shaft, one end of the connecting member is pivoted to the transmission shaft and the other end of the connecting member is pivoted to the bolt, and an axis of rotation of one end of the connecting member relative to the transmission shaft is misaligned with an axis of rotation of the transmission shaft; and one end of the swing arm is connected to the transmission shaft and a connecting seat is formed at the other end of the swing arm, and one end of the airbag is connected to the carriage and the other end of the airbag is connected to the connecting seat.

An elastic element is further mounted between the bolt and the carriage for providing an elastic stress which always pushes the bolt towards the second position.

The elastic element is a spring arranged around the bolt, and both ends of the spring are respectively abutted against the carriage and the bolt.

A limiting arm is fixed on the transmission shaft, an upper limiting member and a lower limiting member located below the upper limiting member are arranged on a cross beam of the carriage, and the limiting arm swings between the upper limiting member and the lower limiting member.

The cross beam includes a web, an upper wing plate located at a top of the web and a lower wing plate located at a bottom of the web. The transmission shaft is connected to the web in a penetrating manner, the limiting arm is fixed to a portion of the transmission shaft located between the upper wing plate and the lower wing plate, the upper wing plate forms the upper limiting member, and the lower wing plate forms the lower limiting member.

The connecting member is a connecting rod, a connecting plate is fixed on the transmission shaft, two connecting parts extending outward in a radial direction of the transmission shaft are provided on the connecting plate, and one end of each of the two connecting rods is connected to a respective one of the two connecting parts through a pivot shaft.

The connecting rod is provided at the other end with a chute extending in a length direction of the connecting rod, and the bolt is provided with a convex column which traverses the chute and is slidable in a length direction of the chute.

A convex portion protruding from the periphery of the transmission shaft is formed at an end of the swing arm away from the connecting seat, and a tension spring is connected between the convex portion and the carriage.

In order to achieve the second object, the present disclosure adopts the following technical scheme.

A trailer carriage is provided, including the above-mentioned locking mechanism of a trailer carriage.

The present disclosure has the following advantageous effects.

In the present disclosure, because the transmission shaft is driven to rotate through the inflation or deflation of the airbag, to drive the bolts to move laterally to achieve the locking and unlocking of the carriage and the frame, a driver can complete the operation of the locking mechanism just by pressing keys in the cab. Therefore, the locking mechanism of the present disclosure requires no physical effort, and is simple to operate and convenient to use, so that the automation degree of the locking mechanism of the carriage is improved.

DETAILED DESCRIPTION

The present disclosure will be further described in conjunction with the drawings and embodiments below.

Figure 1:
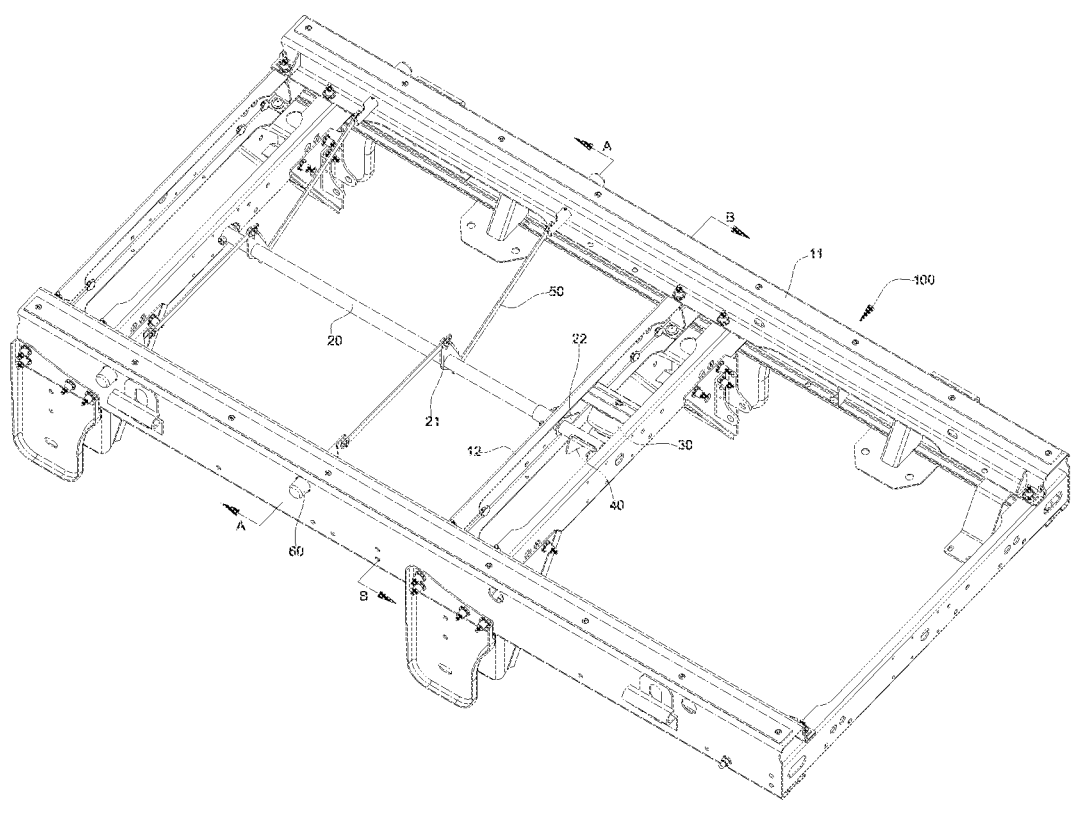
FIG. 1 is a schematic structural view of the present disclosure.
Figure 2:
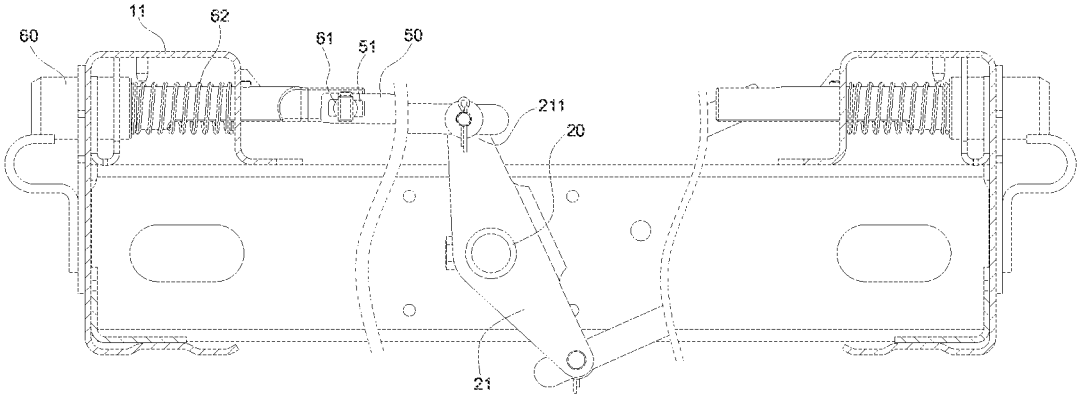
FIG. 2 is a sectional view taken along line A-A of FIG. 1.
Figure 3:
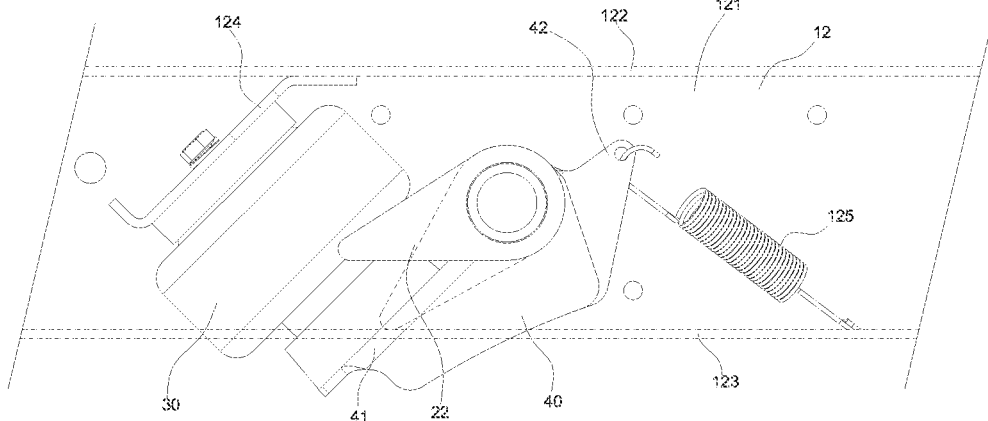
FIG. 3 is a sectional view taken along line B-B of FIG. 1.

As shown in FIGS. 1, 2 and 3, a locking mechanism of a trailer carriage of the present disclosure is mounted on a carriage 100 for locking the carriage 100 to a trailer frame, so as to keep the carriage 100 fixed to the trailer frame, and release the degree of freedom of movement of the carriage 100 relative to the trailer frame when the position of the carriage 100 needs to be adjusted. In an embodiment, the locking mechanism of the present disclosure includes a transmission shaft 20, two bolts 60, an airbag 30 and a swing arm 40. The transmission shaft 20 extends in a length direction of the carriage 100 and is pivoted to the carriage 100, that is, the transmission shaft 20 is rotatable relative to the carriage 100 around a central axis of the transmission shaft 20, and the two bolts 60 are mounted at two sides of the carriage 100. In an embodiment, the two bolts 60 extend in a width direction of the carriage 100 and are movably connected to two longitudinal beams 11 at two sides of the carriage 100 in a penetrating manner. The bolts 60 have degrees of freedom to move relative to the carriage 100 in the width direction of the carriage 100, and the transmission shaft 20 is located just in the middle in the width direction of the carriage 100. Each of the two bolts 60 is connected to the transmission shaft 20 through a connecting member. When rotating, the transmission shaft 20 drives the two bolts 60 to move to the outside of the carriage 100 or to the inside of the carriage 100. That is, under the drive of the transmission shaft 20, each bolt 60 is movable between a first position where the bolt 60 is accommodated in the longitudinal beam 11 and a second position where the bolt 60 protrudes from an outer side edge of the longitudinal beam 11. When the bolt 60 is located at the first position, the bolt 60 is accommodated in the carriage 100, and will not be inserted into a girder of the trailer frame. The carriage 100 may be moved relative to the trailer frame. When the bolt 60 is located at the second position, at least part of the bolt 60 protrudes from the side edge of the carriage 100, such that the bolt 60 will be inserted into a bolt hole in the girder of the trailer frame, thereby locking the carriage 100 to the trailer frame. In order to ensure that the transmission shaft 20 drives the two bolts 60 to move when rotating, one end of the connecting member is pivoted to the transmission shaft 20 and the other end of the connecting member is pivoted to the bolt 60, and an axis of rotation of one end of the connecting member relative to the transmission shaft 20 is misaligned with the axis of rotation of the transmission shaft 20, that is, a connection position of the connecting member on the transmission shaft 20 is deviated from the axis of rotation of the transmission shaft 20. In this way, the bolts 60 can be driven to translate through the connecting member when the transmission shaft 20 rotates. One end of the swing arm 40 is fixedly connected to the transmission shaft 20, and a connecting seat 41 is formed at the other end of the swing arm 40. One end of the airbag 30 is connected to the carriage 100, and the other end of the airbag 30 is connected to the connecting seat 41. In an embodiment, a fixing seat 124 may be welded to a cross beam 12 of the carriage 100, and one end of the airbag 30 may be connected to the fixing seat 124.

After the carriage 100 is assembled on the trailer frame, the airbag 30 may be communicated with an air pump or other air supply unit on the trailer. When the carriage 100 needs to be unlocked from the trailer frame, the airbag 30 is inflated by the air pump, so that the airbag 30 is extended to push the swing arm 40 to swing downward, which in turn drives the transmission shaft 20 to rotate counterclockwise. The transmission shaft 20 drives the two connecting members to pull the two bolts 60 towards the inner side of the carriage 100 respectively, until the two bolts 60 are finally moved to the first position to be detached from the girder of the trailer frame. On the contrary, when the carriage 100 needs to be locked to the trailer frame, the airbag 30 is deflated by the air pump or the airbag 30 is actively depressurized, so that the airbag 30 is contracted to pull the swing arm 40 to swing upwards, which in turn drives the transmission shaft to rotate clockwise. The transmission shaft 20 drives the two connecting members to push the two bolts 60 towards the outer side of the carriage 100 respectively, until the two bolts 60 are finally moved to the second position to be inserted into the girder of the trailer frame. In the present disclosure, because the transmission shaft is driven to rotate through the inflation or deflation of the airbag, to drive the bolts to move laterally to realize the locking and unlocking of the carriage and the frame, a driver can complete the operation of the locking mechanism just by pressing keys in the cab. Therefore, the locking mechanism of the present disclosure requires no physical effort, and is simple to operate and convenient to use, so that the automation degree of the locking mechanism of the carriage is improved.

In a preferred embodiment, an elastic element is further mounted between the bolt 60 and the carriage 100. The elastic element is configured to provide an elastic stress that always pushes the bolt 60 towards the second position, that is, the elastic element always pushes the bolt 60 towards the outer side. In an embodiment, the elastic element may be a spring 62 arranged around the bolt 60. An inner side end of the spring is abutted against the longitudinal beam 11 of the carriage 100, and an outer side end of the spring is abutted against a stepped surface provided on the bolt 60. In other embodiments, the elastic element may also be a rubber block with elasticity or the like, so long as the elastic element can always push the bolt 60 towards the outer side. In addition, a limiting arm 22 is fixed on the transmission shaft 20. An upper limiting member and a lower limiting member are arranged on the carriage 100, and the lower limiting member is located below the upper limiting member and is arranged vertically opposite to the upper limiting member. When the transmission shaft 20 rotates, the limiting arm 22 swings between the upper limiting member and the lower limiting member, which limit a swing angle of the limiting arm 22, and then limit a rotation angle of the transmission shaft 20, such that the transmission shaft 20 can only rotate within a preset angle range. In this way, the airbag 30 is limited such that the expansion or contraction of the airbag 30 will not exceed a tolerance range of the airbag, thereby protecting the airbag 30. In particular, when the airbag 30 is expanded, a maximum downward swing angle of the limiting arm 22 is limited by the lower limiting member, to prevent the airbag 30 from being excessively extended, thereby effectively protecting the airbag 30. Meanwhile, because the rotation angle of the transmission shaft 20 is limited, when the bolt 60 retracts to the inner side of the carriage 100, the spring 62 will not be compressed too much, preventing the spring 62 from being over-compressed and failing, which is beneficial to ensuring that the locking mechanism can move stably for a long time. The cross beam 12 of the carriage 100 includes a web 121, an upper wing plate 122 located at the top of the web 121, and a lower wing plate 123 located at the bottom of the web 121. The transmission shaft 20 is connected to the web 12 in a penetrating manner to pivotally engage the carriage 100, and the limiting arm 22 is fixedly connected to a portion of the transmission shaft 20 located between the upper wing plate 122 and the lower wing plate 123. In this way, the upper wing plate 122 forms the above-mentioned upper limiting member, and the lower wing plate 123 forms the above-mentioned lower limiting member. In other embodiments, other structures on the carriage 100 may be adopted to form the above-mentioned upper limiting member and lower limiting member to limit the swing angle range of the limiting arm 22.

In the present disclosure, the connecting member is a connecting rod 50. A connecting plate 21 is fixed on the transmission shaft 20, and two connecting parts extending outwards in a radial direction of the transmission shaft 20 are provided on the connecting plate 21. One end of each of the two connecting rods 50 is connected to a respective one of the two connecting parts through a pivot shaft. In this way, an axis of relative rotation between the connecting rod 50 and the connecting plate 21 is misaligned with the axis of rotation of the transmission shaft 20 by a certain distance, and the other ends of the two connecting rods 50 are respectively pivoted to the two bolts 60. In an embodiment, the connecting rod 50 is provided at the other end with a chute 51 extending in a length direction of the connecting rod 50, the bolt 60 is provided with a convex column 61 at the inner side end, and the convex column 61 traverses the chute 51 and is slidable in a length direction of the chute 51. Because the bolt 51 is limited by a hole in the longitudinal beam 11 and only has a degree of freedom to move in the width direction of the carriage 100, when the transmission shaft 20 moves, the connecting rod 50 may produce a certain change in angle. By placing the convex column 61 of the bolt 60 in the chute 51 of the connecting rod 50, the axis of relative rotation between the bolt 60 and the connecting rod 50 can adaptively change in the length direction of the chute 51, such that the bolt 60 can be prevented from being stuck.

In addition, in the present disclosure, a convex portion 42 protruding from the periphery of the transmission shaft 20 is formed at an end of the swing arm 40 away from the connecting seat 41, and a tension spring 125 is connected between the convex portion 42 and the cross beam 12 of the carriage 100. In this way, the tension spring 125 always provides an elastic stress which pulls the convex portion 42 of the swing arm 40 downward, and the convex portion 42 and the connecting seat 41 form a lever structure with the central axis of the transmission shaft 20 as the axis. Under the pulling of the tension spring 125, the connecting seat 41 always tends to move upward. When the airbag 30 is depressurized and contracted, the airbag 30 and the transmission shaft 20 can be reset under the pulling of the tension spring 125.

Referring to FIG. 1, the trailer carriage of the present disclosure includes the above-mentioned locking mechanism of a trailer carriage, and other structures of the trailer carriage are the same as those in the existing technology, which will not be described in detail here.

The above embodiments are only used for illustrating the technical schemes of the present disclosure, but are not intended to limit the same. Although the present disclosure is described in detail with reference to the foregoing embodiments, it will be understood by those having ordinary skills in the art that modifications may be made to the technical schemes described in the foregoing embodiments, or equivalent replacements may be made to some of the technical features. These modifications or replacements do not make the essence of corresponding technical schemes depart from the protection scope of the technical schemes of the embodiments of the present disclosure.

What is claimed is:

1. A locking mechanism of a trailer carriage, which is mounted on the carriage and comprises a transmission shaft, two bolts, an airbag, and a swing arm, wherein:

the transmission shaft is pivotably attached to the carriage and extends in a length direction of the carriage;

each bolt of the two bolts is movably connected to one side of two opposite sides of the carriage in a penetrating manner, each of the two bolts is movable in a width direction of the carriage between a first position where each bolt of the two bolts is accommodated in one side of the two opposite sides of the carriage and a second position where each bolt of the two bolts protrudes from one side edge of two opposite side edges of the carriage, a connecting member is arranged between each bolt of the two bolts and the transmission shaft, a first end of the connecting member is pivotably attached to the transmission shaft and a second end of the connecting member is pivotably attached to each bolt of the two bolts, and an axis of rotation of the first end of the connecting member relative to the transmission shaft is offset with an axis of rotation of the transmission shaft; and a first end of the swing arm is connected to the transmission shaft and a connecting seat is formed at a second end of the swing arm, and a first end of the airbag is connected to the carriage and a second end of the airbag is connected to the connecting seat, wherein a convex portion protruding from a periphery of the transmission shaft is formed at an end of the swing arm away from the connecting seat, and a tension spring is connected between the convex portion and the carriage.

2. The locking mechanism of a trailer carriage of claim 1, wherein an elastic element is further mounted between each bolt of the two bolts and one side of the two opposite sides of the carriage for providing an elastic stress which always pushes each bolt of the two bolts towards the second position.

3. The locking mechanism of a trailer carriage of claim 2, wherein the elastic element comprises two springs, one spring of the two springs arranged around each bolt of the two bolts, and a first end of each spring of the two springs and a second end of each of the two springs are respectively abutted against one side of the two opposite sides of the carriage and each bolt of the two bolts.

4. The locking mechanism of a trailer carriage of claim 3, wherein a limiting arm is fixed on the transmission shaft, an upper limiting member and a lower limiting member located below the upper limiting member are arranged on a cross beam of the carriage, and the limiting arm swings between the upper limiting member and the lower limiting member.

5. The locking mechanism of a trailer carriage of claim 4, wherein the cross beam comprises a web, an upper wing plate located at a top of the web and a lower wing plate located at a bottom of the web, the transmission shaft is connected to the web in a penetrating manner, the limiting arm is fixed to a portion of the transmission shaft located between the upper wing plate and the lower wing plate, the upper wing plate forms the upper limiting member, and the lower wing plate forms the lower limiting member.

6. The locking mechanism of a trailer carriage of claim 1, wherein the connecting member is a connecting rod, a connecting plate is fixed on the transmission shaft, two connecting parts extending outward in a radial direction of the transmission shaft are provided on the connecting plate, and a first end of a first connecting rod is connected to a first connecting part through a pivot shaft and a first end of a second connecting rod is connected to a second connecting part through a pivot shaft.

7. The locking mechanism of a trailer carriage of claim 6, wherein a second end of the first connecting rod is provided with a first chute and a second end of the second connecting rod is provided with a second chute, wherein the first chute extends in a length direction of the first connecting rod and one bolt of the two bolts, the second chute extends in a length direction of the second connecting rod and one bolt of the two bolts, and each bolt of the two bolts is provided with a convex column which traverses the chute and is slidable in a length direction of the chute.

8. A trailer carriage, comprising the locking mechanism of a trailer carriage of claim 1, wherein a convex portion protruding from a periphery of the transmission shaft is formed at an end of the swing arm away from the connecting seat, and a tension spring is connected between the convex portion and the carriage.

9. The trailer carriage of claim 8, wherein an elastic element is further mounted between each bolt of the two bolts and one side of the two opposite sides of the carriage for providing an elastic stress which always pushes each bolt of the two bolts towards the second position.

10. The trailer carriage of claim 9, wherein the elastic element comprises two springs, one spring of the two springs arranged around each bolt of the two bolts, and a first end of each spring of the two springs and a second end of each of the two springs are respectively abutted against one side of the two opposite sides of the carriage and each bolt of the two bolts.

11. The trailer carriage of claim 10, wherein a limiting arm is fixed on the transmission shaft, an upper limiting member and a lower limiting member located below the upper limiting member are arranged on a cross beam of the carriage, and the limiting arm swings between the upper limiting member and the lower limiting member.

12. The trailer carriage of claim 11, wherein the cross beam comprises a web, an upper wing plate located at a top of the web and a lower wing plate located at a bottom of the web, the transmission shaft is connected to the web in a penetrating manner, the limiting arm is fixed to a portion of the transmission shaft located between the upper wing plate and the lower wing plate, the upper wing plate forms the upper limiting member, and the lower wing plate forms the lower limiting member.

13. The trailer carriage of claim 8, wherein the connecting member is a connecting rod, a connecting plate is fixed on the transmission shaft, two connecting parts extending outward in a radial direction of the transmission shaft are provided on the connecting plate, and a first end of each connecting rod of the two connecting rods is connected to a respective one of the two connecting parts through a pivot shaft.

14. The trailer carriage of claim 13, wherein each connecting rod of the two connecting rods is provided at a second end with a chute extending in a length direction of each connecting rod of the two connecting rods, and each bolt of the two bolts is provided with a convex column which traverses the chute and is slidable in a length direction of the chute.

\* \* \* \* \*